(12) United States Patent
Choi et al.

(10) Patent No.: US 6,433,184 B1
(45) Date of Patent: Aug. 13, 2002

(54) POLYAMIDE-IMIDE HAVING HEAD-TO-TAIL BACKBONE

(75) Inventors: Kil-Yeong Choi; Jae Heung Lee; Young-Taik Hong; Moon Young Jin; Kyoung-Su Choi, all of Daejeon; Ho-Jin Park, Kyungki-do, all of (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 72 days.

(21) Appl. No.: 09/605,026

(22) Filed: Jun. 28, 2000

(30) Foreign Application Priority Data

Jun. 29, 1999 (KR) .............................................. 99-25083

(51) Int. Cl.$^7$ ...................... C07D 209/48; C08G 69/44; C08G 73/16
(52) U.S. Cl. ........................ 548/476; 528/289; 528/314; 548/461; 548/473
(58) Field of Search .......................... 548/473; 528/289, 528/314

(56) References Cited

PUBLICATIONS

W. Wrasidlo and J. M. Augl; Journal of Polymer Science: Part A–1, vol. 7; "Aromatic Polymide–co Amides"; 1969; pp. 321–332.

J. G. de la Campa and J. de Abajo; European Polymer Journal, vol. 19, No. 8; Copolyamide–imides of Controlled Microstructure;1983; pp. 667–671.

*Primary Examiner*—Floyd D. Higel
(74) *Attorney, Agent, or Firm*—McGuireWoods LLP

(57) ABSTRACT

The present invention relates to polyamide-imides having head-to-tail backbone and more particularly, to polyamide-imimdes having head-to-tail ragularity to provide excellent heat and chemical resistance, physical and mechanical properties, processability, and gas permeability and selectivity. The polyamide-imides represented in the following formula (1) are obtained by direct polymerization, in the presence of dehydrating catalyst, of alone or as a mixture of 2 or above of monomers prepared by condensation of an amine compound having a nitro group with a carboxylic acid anhydride,

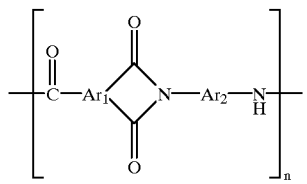

(1)

8 Claims, 3 Drawing Sheets

HEAD-TO-TAIL BACKBONE (EXAMPLE 1)

POLYAMIDE-IMIDE HAVING HEAD-TO-TAIL BACKBONE

BACKGROUND OF THE INVENTION

FIELD OF THE INVENTION

The present invention relates to novel polyamide-imides having head-to-tail backbone and more particularly, to novel polyamide-imides having head-to-tail regularity to provide excellent heat and chemical resistance, physical and mechanical properties, processability, and gas permeability and selectivity. The polyamide-imides represented in the formula (1) are obtained by direct polymerization, in the presence of dehydrating catalyst, of alone or as a mixture of two or above of monomers prepared by condensation of an amine compound having a nitro group with a carboxylic acid anhydride.

(1)

wherein $Ar_1$ is selected from the group consisting of in which $R_1$, $R_2$, $R_3$ and $R_4$ are the same or different and a hydrogen atom or $C_1$~$C_4$ alkyl group; and X is selected from the group consisting of —O—, —S—, —SO$_2$—, —CO—, —C(CH$_3$)$_2$—, —C(CF$_3$)$_2$—, -continued and Generally, polyamide-imides are prepared by polycondensation of an aromatic tricarboxylic acid anhydride or its derivatives with an aromatic diamine. Therefore, polyamide-imides have alternative arrangement of an amide and imide structures. However, polycondensation of trimellitic acid anhydride or its derivatives as unsymmetric monomers with diamines produce copolymers having a mixed structure of imide-imide backbone or amide-amide (head-to-head or tail-to-tail) and imide-amide (head-to-tail) to have different composition and microstructure because of different reactivities of functional groups in trimellitic acid anhydride or its derivatives. Each structure is shown in the following;

These microstructures of copolymers are disclosed in Polymer J. 19(8), 667(1983) and J. Polym. Sci., 7, 321 (1969).

Commercial polyamide-imides unlike polyimides are injection-moldable amorphous thermoplastic resins having good physical properties. A method of preparing polyamide-imides comprise the polymerization of polyimides with amides and in particular, introduction of amide functional group to polyimides enhance processability. These polyamide-imide resins have randomly mixed structure of head-to-head (or tail-to-tail) and head-to-tail due to no control of the reactivity of an aromatic tricarboxylic acid anhydride (or its derivatives) and a diamine. These random copolymers having disordered arrangement have poor chemical and heat resistance and mechanical properties, thus decrease gas separation properties.

To overcome such shortcomings, intensive studies have been conducted to prepare polyamide-imides having a certain arrangement to provide excellent heat resistance, mechanical properties and gas separation properties.

Polyamide-imides having head-to-head or tail-to-tail backbone are disclosed in German Patent No. 2, 425, 666, Japanese Patent No. 7, 441., 119, J. Polym, Sci., 7, 321 (1969) and Macromol. Cliem., 191, 155(1990). However, their heat resistance and other mechanical properties are not improved much.

Another polyamide-imide having head-to-head or tail-to-tail backbone is disclosed in ACS Polymeric Materials Science and Engineering, 77, 289(1997) to improve gas separation property but it is not improved much, either.

SUMMARY OF THE INVENTION

It is an object of the present invention to prepare novel polyamide-imides having head-to-tail arrangement structure which provide excellent heat resistance, chemical resistance, physical and mechanical properties and thus enhance gas permeability and selectivity.

DETAILED DESCRIPTION OF THE INVENTION

The present invention relates to polyamide-imides having head-to-tail backbone represented in the formula (1), (1)

wherein $Ar_1$ and $Ar_2$ are the same as described above.

The detailed description of the present invention is given hereunder.

Polyamide-imides having head-to-tail backbone are prepared by polycondensation of an aromatic tricarboxylic acid anhydride with an amine compound having a nitro group, followed by reduction to give a monomer having amine and acid functional groups expressed in the formula (2), and then subjecting the resulting monomers themselves to direct polymerization, (2)

wherein $Ar_1$ and $Ar_2$ are the same as described above.

The structure of polyamide-imides having head-to-tail backbone are determined by $^1$H-NMR and they have strong hydrogen bonding due to regularity arrangement and thus improve heat resistance, mechanical properties resulting in enhancement of gas separation coefficient.

In the process of preparing polyamide-imides having head-to-tail backbone by direct polymerization using triphenylphosphite, monomers dissolved in a mixture of pyridine, containing triphenylphosphite and anhydrous lithium chloride, and N-methyl-2-pyrrolidone are reacted at 50–200° C. for 1–24 hr and the resulting mixture was precipitated from non polar solvent such as methanol.

Polyamide-imides of the present invention are well soluble in dimethylacetamide(DMAc), dimethylsulfoxide (DMSO), and N-methyl-2-pyrrolidone (NMP). Glass transition temperature(Tg) thereof was determined by using maximum tan δ peak droved from dynamic mechanical analyzer, ranging 200–500° C. Thermo stability was measured by thermogravimetric analysis(TGA), ranging 300–500° C. Gas permeability was determined by time-lag system at 35° C. at the pressure of 10 atm using a membrane having 30–50 μm thick. This membrane was prepared by dissolving polyamide-imides in N-methyl-2-pyrrolidone (NMP) or N,N-dimethylacetamide(DMAc) and dried at 250° C. for 24 hr. Permeability of oxygen is in the range of 0.001–10 barrer, nitrogen is in the range of 0.001–10 barrer, and helium is 1–400 barrer. Separation coefficient of helium to nitrogen is in the range of 10–500.

The following Examples illustrate preferred embodiments of this invention. It will be understood that these Examples are for illustrative purposes only and do not purport to be wholly definitive with respect to conditions or scope of the invention.

EXAMPLE 1

(1) Preparation of Monomers

4-Amino-4-nitrodiphnyl ether (46.0 g, 0.2 mol) dissolved in 1 L of DMF was added slowly to a mixture of trimellitic acid anhydride (TMA; 38.42 g) and DMF (500 ml) in 2.5 L of 4-necked flask under $N_2$. The mixture was stirred at room temperature for 3 hr and then toluene was added to the reaction mixture. The reaction mixture was heated at reflux by removing water produced during the reaction by azeotropy. The reaction mixture was cooled and separated yellow precipitates out. The precipitates were recrystallized from ethanol to obtain N-[4-(4-nitrophenoxy) phenyl] trimellitimide (10 g). The recrystallized compound was dissolved in DMF (200 ml) with heating and then placed in 400 ml of hydrogenation bottle. 10% of palladium on carbon (1 g) was added and the reaction mixture was reduced, by hydrogenation at 50° C. for 7 hr. The reaction mixture was filtered to remove the catalyst by using membrane filter. The half of filtrate was evaporated and then the rest was precipitated in water to give N-[4-(4-aminophenoxy)phenyl] trimelitimide (85%; mp 253.9° C.).

(2) Preparation of polymers

A mixture of N-[4-(4-aminophenoxy)phenyl] trimelitimide (ODTI see Table 1; 11.23 g, 0.03 mol), triphenylphosphite (9.30 g, 0.03 mol), N-methyl-2-pyrrolidone (200 ml), pyridine (50 ml) and anhydrous lithium chloride (10 g) was condensed at 110° C. for 3 hr under $N_2$. After the reaction mixture was cooled, it was precipitated in methanol using high-speed Waring blender. The yellow precipitates were dried at 150° C. for 24 hr under the reduced pressure to give polyamide-imides having head-to-tail backbone as powder. The yield was 99% and the inherent viscosity was 1.42 dL/g measured in N-methyl-2-pyrrolidone(NMP) at the concentration of 0.5 g/dL at 30° C.

EXAMPLE 2

3-nitroaniline (27.6 g) was used instead of 4-amino-4-nitrodiphenyl ether in the preparation of a monomer and N-(3-aminophenyl)trimellitimide (mPTI, see Table 1; 8.46 g) was used instead of ODTI in the preparation of a polymer. Other reaction conditions were the same as Example 1 to obtain a polyamide-imide. The inherent viscosity was 0.61 dL/g measured in N,N-dimethylacetamide(DMAc) at the concentration of 0.5 g/ dL at 30° C.

EXAMPLE 3

2-methyl-5-nitroaniline (30.4 g) was used instead of 4-amino-4-nitrodiphenyl ether in the preparation of a monomer and TDTI (see Table 1; 8.89 g) was used instead of ODTI in the preparation of a polymer. Other reaction conditions were the same as Example 1 to obtain a polyamide-imide. The inherent viscosity was 0.68 dL/g measured in N,N-dimethylacetamide(DMAc) at the concentration of 0.5 g/dL at 30° C.

EXAMPLE 4

(1) Preparation of a Monomer 3-nitromesidine (34.23 g, 0.19 mol) was added to a mixture of trimellitic acid anhydride (TMA; 36.50 g, 0.19 mol) and DMF (250 ml) in 0.5 L of 4-necked flask equipped with reflux condenser, thermometer and stirrer under $N_2$. The mixture was stirred at room temperature for 3 hr and then toluene (50 ml) was added to the reaction mixture. The reaction mixture was heated at reflux by removing water produced during the reaction by azeotropy. After cooling the reaction mixture and evaporating DMF, the precipitates were recrystallized from ethanol to obtain N-[3-nitro-(2,4,6-trimethyl)phenyl]trimellitimide (56.3 g, 83.6%). The melting point was 294° C. measured by differential scanning calorimeter(DSC). The recrystallized compound was dissolved in DMF (200 ml) with heating and then placed in 500 ml of hydrogenation bottle. 10% of palladium on carbon (10 g) was added and the reaction mixture was reduced by hydrogenation at 50° C. for 7 hr under a pressure of 50 psi. The reaction mixture was filtered to remove the catalyst by using membrane filter. The half of filtrate was evaporated and then the rest was precipitated in water and washed with ethanol to give N-[3-amino-(2,4,6-trimethyl) phenyl] trimellitimide (DMTI; mp 246.7° C.).

(2) Preparation of polymers

A mixture of N-[3-amino-(2,4,6-trimethyl)phenyl] trimellitimide (DMTI, see Table 1; 12.97 g, 0.03 mol), triphenylphosphite (15.51 g), N-methyl-2-pyrrolidone (80 ml), pyridine (20 ml) and calcium chloride (10.1 g) was performed by the same procedure of Example 1 to give a polyamide-imide having head-to-tail backbone. The inherent viscosity was 0.50 dL/g measured in N,N-dimethylacetamide (DMAc) at the concentration of 0.5 g/ dL at 30° C.

EXAMPLE 5

FDTI (see Table 1; 15.67 g, 0.03 mol) was used instead of DMTI in the preparation of a polymer. Other reaction conditions were the same as Example 4 to obtain a polyamide-imide. The inherent viscosity was 0.68 dL/g measured in N,N-dimethylacetamide(DMAc) at the concentration of 0.5 g/ dL at 30° C.

EXAMPLE 6

6FTI (see Table 1; 15.25 g, 0.03 mol) was used instead of DMTI in the preparation of a polymer. Other reaction conditions were the same as Example 4 to obtain a polyamide-imide. The inherent viscosity was 0.58 dL/g measured in N,N-dimethylacetamide (DMAc) at the concentration of 0.5 g/dL at 30° C.

EXAMPLE 7

IPTI (see Table 1; 17.7 g, 0.03 mol) was used instead of DMTI in the preparation of a polymer. Other reaction conditions were the same as Example 4 obtain a polyamide-imide. The inherent viscosity was 0.81 dL/g measured in N,N-dimethylacetamide(DMAc) at the concentration of 0.5 g/dL at 30 ° C.

EXAMPLE 8

PFTI (see Table 1; 20.7 g, 0.03 mol) was used instead of DMTI in the preparation of a polymer. Other reaction conditions were the same as Example 4 to obtain a polyamide-imide. The inherent viscosity was 0.65 dL/g measured in N,N-dimethylacetamide(DMAc) at the concentration of 0.5 g/dL at 30° C.

EXAMPLE 9

ODTI (see Table 1; 7.86 g) and mTPI (see Table 1; 2.54 g) were used instead of ODTI in the preparation of a polymer. Other reaction conditions were the same as Example 1 to obtain a polyamide-imide. The inherent viscosity was 0.89 dL/g measured in N,N-dimethylacetamide (DMAc) at the concentration of 0.5 g/dL at30° C.

EXAMPLE 10

DMTI (see Table 1; 5.42 g) and mTPI (see Table 1; 2.54 g) were used instead of DMTI in the preparation of a polymer. Other reaction conditions were the same as Example 4 to obtain a polyamide-imide. The inherent viscosity was 0.95 dL/g measured in N,N-dimethylacetamide (DMAc) at the concentration of 0.5 g/dL at30° C.

EXAMPLE 11

DMTI (see Table 1; 4.85 g) and 6FTI (see Table 1; 7.63 g) were used instead of DMTI in the preparation of a polymer. Other reaction conditions were the same as Example 4 to obtain a polyamide-imide. The inherent viscosity was 0.75 dL/g measured in N,N-dimethylacetamide (DMAc) at the concentration of 0.5 g/dL at 30° C.

TABLE 1

| Category | $Ar_1$ | $Ar_2$ |
|---|---|---|
| Example 1 |  | <br>(ODTI) |
| Example 2 |  | <br>(mPTI) |
| Example 3 |  | <br>(TDTI) |
| Example 4 |  | <br>(DMTI) |
| Example 5 |  | <br>(FDTI) |

TABLE 1-continued

| Category | Ar₁ | Ar₂ |
|---|---|---|
| Example 6 |  |  (6FTI) |
| Example 7 |  |  (IPTI) |
| Example 8 |  |  (PFTI) |
| Example 9 |  |  (70)     (30) |
| Example 10 |  |  (70)     (30) |
| Example 11 |  |  (50)     (50) |

COMPARATIVE EXAMPLE 1

Trimellitic acid chloride (8.42 g) was added to oxydianiline (8.01 g) dissolved in purified NMP (140 ml). The mixture was reacted at 50° C for 3 hr and propyleneoxide (2.32 g, 0.04 mol) was then added and reacted at room temperature for 10 hr. Polyamideamic acid produced was reacted with an anhydrous acetic acid (24 ml) and pyridine at room temperature for 24 hr. After that, the reaction condition was performed the same as Example 1 to obtain random copolymers having head-to-head or tail-to-tail and head-to-tail backbone. The inherent viscosity was 0.85 dL/g measured in N,N-dimethylacetamide(DMAc) at the concentration of 0.5 g/ dL at 30° C.

COMPARATIVE EXAMPLE 2 m-Phenylene diamine (4.32 g) was used instead of oxydianiline in the preparation of a polymer. Other reaction conditions were the same as Comparative Example 1 to obtain a polyamide-imide. The inherent viscosity was 0.46 dL/g measured in N,N-dimethylacetamide(DMAc) at the concentration of 0.5 g/dL at 30° C.

COMPARATIVE EXAMPLE 3

2,4-diaminomesitylene (6.00 g) was used instead of oxydianiline in the preparation of a polymer. Other reaction conditions were the same as Comparative Example 1 to obtain a polyamide-imide. The inherent viscosity was 0.42 dL/g measured in N,N-dimethylacetamide(DMAc) at the concentration of 0.5 g/dL at30° C.

COMPARATIVE EXAMPLE 4

A mixture of oxy-bis[N-(4-phenylene)trimellitimide (8.17 g, 0.015 mol), oxydianiline (6.00 g, 0.015 mol), triphenylphosphite (9.30 g, 0.03 mol), N-methyl-2-pyrrolidone (320 ml), pyridine (80 ml) and anhydrous lithium chloride (1.6 g) was polymerized at 110° C. for 3 hr under $N_2$ to give a polyamide-imide having head-to-head or tail-to-tail backbone. The inherent viscosity was 0.87 dL/g measured in N,N-dimethylacetamide(DMAc) at the concentration of 0.5 g/ dL at 30° C.

COMPARATIVE EXAMPLE 5

A mixture of 2,4,6-trimethyl-1,3-phenylene-bis(N-trimellitimide) (9.97 g, 0.02 mol), 2,4-diaminomesithylene (3.00 g, 0.02 mol), triphenylphosphite (12.41 g), N-methyl-2-pyrrolidone (160 ml), pyridine (40 ml) and anhydrous lithium chloride (8 g) was polymerized at 110° C. for 3 hr under $N_2$ to give a polyamide-imide having head-to-head or tail-to-tail backbone. The inherent viscosity was 0.72 dL/g measured in N,N-dimethylacetamide (DMAc) at the concentration of 0.5 g/dL at 30° C.

Table 2 shows physical properties of polyamide-imides prepared by Examples 1–11 and Comparative Examples 1–5.

TABLE 2

| Catagory | Inherent viscosity $\eta_{inch}$ (dL/g) | Glass transition temperature (° C.) | Initial decomposition temperature (° C.) | Tensile strength (kgf/cm$^2$) |
|---|---|---|---|---|
| Example 1 | 1.42 | 330 | 433 | 1490 |
| Example 2 | 0.61 | 370 | 452 | 1450 |
| Example 3 | 0.68 | 390 | 385 | 1320 |
| Example 4 | 0.50 | 430 | 420 | 1390 |
| Example 5 | 0.68 | 308 | 400 | 1305 |
| Example 6 | 0.58 | 312 | 410 | 1330 |
| Example 7 | 0.81 | 320 | 360 | 1260 |
| Example 8 | 0.65 | 300 | 375 | 1280 |
| Example 9 | 0.89 | 350 | 430 | 1270 |
| Example 10 | 0.95 | 350 | 440 | 1420 |
| Example 11 | 0.75 | 400 | 430 | 1350 |
| Com. Example 1 | 0.85 | 280 | 400 | 1160 |
| Com. Example 2 | 0.46 | 310 | 390 | 1190 |
| Com. Example 3 | 0.42 | 390 | 395 | 1180 |
| Com. Example 4 | 0.87 | 285 | 400 | 1280 |
| Com. Example 5 | 0.72 | 400 | 403 | 1190 |

As shown in Table 2, polyamide-imides having head-to-tail backbone prepared by Examples 1–11 of the present invention are amorphous thermoplastic resins and inherent viscosities thereof are in the range of 0.50–1.42 measured in N,N-dimethylacetamide(DMAc) or N-methyl-2-pyrrolidone. Moreover, film-forming property by solvent casting is excellent and glass transition temperature is very high of over 308° C.

Polyamide-imides having head-to-tail backbone of the present invention have higher glass transition temperature, initial decomposition temperature and physical and mechanical properties than those having head-to-head (or tail-to-tail) backbone prepared by Comparative Examples 4 and 5 or those prepared by random polymerization in Comparative Examples 1–3. For example, when polyamide-imide resins prepared from oxydianiline, polyamide-imides having head-to-tail regularity of Example 1 have higher glass transition temperature, initial decomposition temperature and physical and mechanical properties than those prepared by random polymerization of Comparative Example 1 or those having head-to-head (or tail-to-tail) backbones prepared by Comparative Examples 4. Polyamide-imides prepared from m-phenylene diamine show similar properties in Example 4 and Comparative Example 4. Furthermore, the glass transition temperature can be controlled by mixing different monomers which are used to prepare polyamide-imides to change the structures. These are shown in Examples 10 and 11.

The solubilities of polyamide-imides prepared by Examples and Comparative Examples are shown in Table 3.

TABLE 3

| Section | Solubility | | | | | |
|---|---|---|---|---|---|---|
| | NMP | DMAc | m-Cresol | Pyridine | CHCl$_3$ | THF |
| Example 1 | ++ | −− | −− | −− | −− | −− |
| Example 2 | ++ | −− | −− | −− | −− | −− |
| Example 3 | ++ | +− | +− | +− | −− | −− |
| Example 4 | ++ | +− | +− | +− | −− | −− |
| Example 5 | ++ | +− | +− | +− | −− | −− |
| Com. Example 1 | ++ | ++ | ++ | ++ | −− | −− |
| Com. Example 2 | ++ | ++ | ++ | ++ | −− | −− |
| Com. Example 4 | ++ | ++ | ++ | ++ | −− | −− |

++: soluble at room temperature,
+−: soluble with heating,
−−: insoluble

As shown in Table 3, the solubility is depending on the chemical structures and polyamide-imides having head-to-tail backbone have superior chemical resistance to others. For example, polyamide-imides having head-to-tail backbone prepared from oxydianiline of Example 1 have superior chemical resistance in DMAc, m-cresol and pyridine to those having head-to-head backbone of Comparative Example 4 and those by random polymerization of Comparative Example 1.

Gas permeabilities of polyamide-imides prepared by above Examples and Comparative Examples are shown in Table 4.

TABLE 4

| Category | Gas permeability (barrer) | | | Separation coefficient | |
|---|---|---|---|---|---|
| | Oxygen | Nitrogen | Helium | Oxygen from nitrogen | Helium from nitrogen |
| Example 4 | 4.82 | 0.58 | 64.4 | 8.31 | 111.0 |
| Example 5 | 2.75 | 0.28 | 36.5 | 9.82 | 130.4 |
| Example 6 | 3.95 | 0.47 | 52.7 | 8.40 | 112.1 |
| Example 7 | 4.02 | 0.44 | 45.6 | 9.13 | 103.6 |
| Example 8 | 4.40 | 0.50 | 48.9 | 8.80 | 97.8 |
| Example 10 | 2.20 | 0.18 | 43.5 | 12.2 | 241.7 |
| Com. Example 3 | 4.80 | 0.75 | 52.4 | 6.40 | 69.9 |
| Com. Example 5 | 4.40 | 0.65 | 44.4 | 6.77 | 68.0 |

1) $\text{Barrer} = 1 \times 10^{-10} \times \dfrac{\text{cm}^3(\text{STP}) \cdot \text{cm}}{\text{cm}^2 \text{sec} \cdot \text{cmHg}}$ 2) $\text{Gas permeability} = \dfrac{Q \cdot l}{\Delta P \cdot A} [\text{barrer}]$

[wherein Q is permeation speed of gas (cc/sec), Δ P difference in pressure between top and bottom (cmHg), A is area of membrane (cm$^2$), and l is thickness of membrane (cm)]
3) Separation coefficient = gas A permeability/gas B permeability As shown in Table 4, gas separation coefficients of polyamide-imides having head-to-tail backbone are highly improved. Polyamide-imides having head-to-tail backbone prepared from 2,4-diaminomesithylene by Example 4 have similar gas permeabilities in oxygen, nitrogen and helium gases to those prepared by Comparative Examples 3 and 5 but separation coefficients of polyamide-imides having head-to-tail backbone are much more improved than others.

Figure 1:
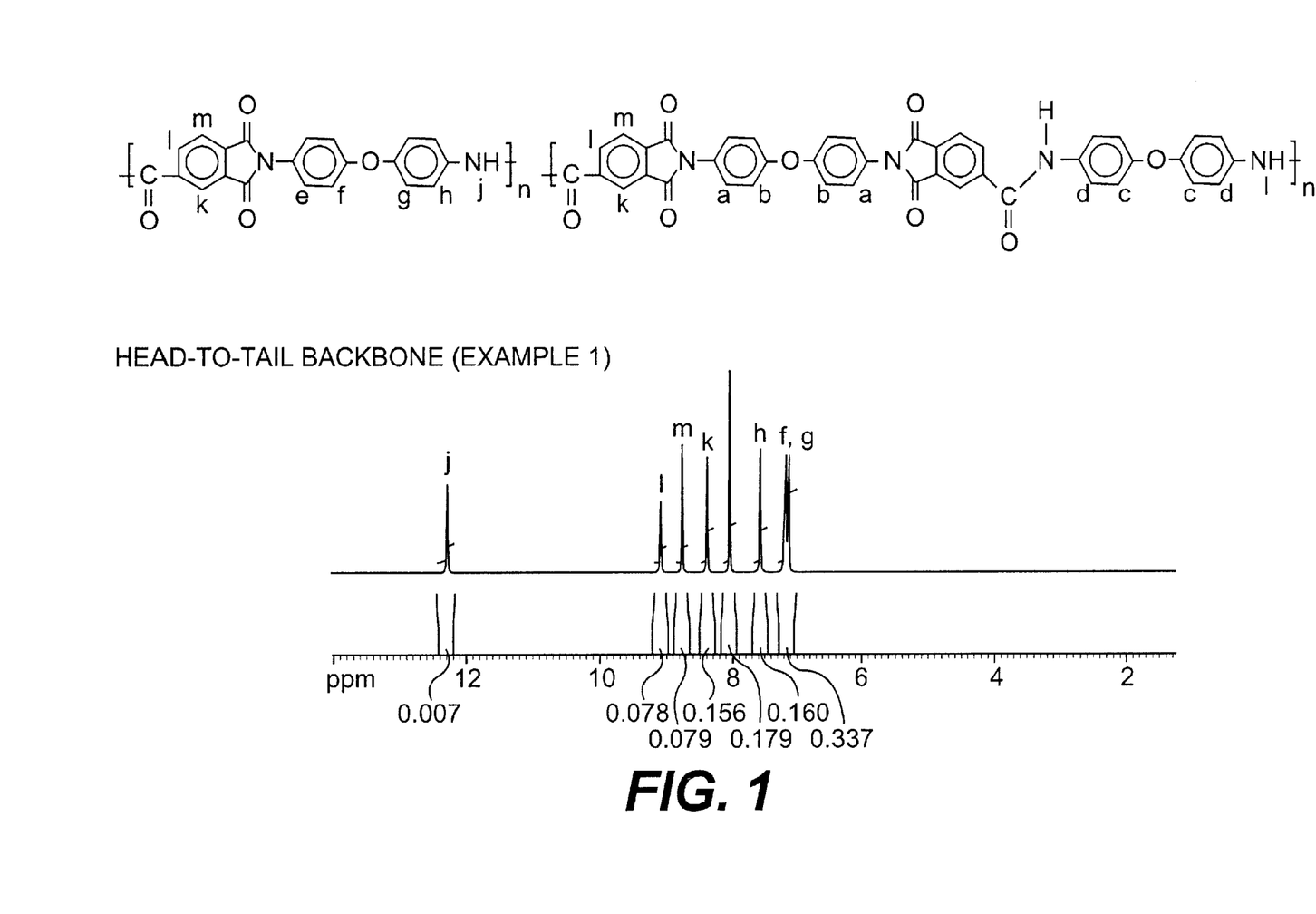
FIG. 1 shows $_1$H-NMR spectrums of polyamide-imides prepared from oxydiariline having head-to-tail, random arrangement(randomly mixed structure of head-to-head or tail-to-tail and head-to-tail) and head-to-head backbones.

FIG. 1 is $^1$H-NMR spectrums of polyamide-imides having head-to-tail backbone(Example 1), random copolymers (Comparative Example 1), and head-to-head backbone (Comparative Example 5). Peak of —NH— proton shows at 12.3 ppm for head-to-tail backbone, at 12.2 ppm for head-to-head backbone and both for random copolymers. The backbone structures could be distinguished from one another based on the $^1$H-NMR signals of f and g protons, of which head-to-tail backbone is observed at 7.15–7.26 ppm as compared with those of head-to-head backbone at 7.05–7.33 ppm and those of random copolymers(mixed).

Figure 2:
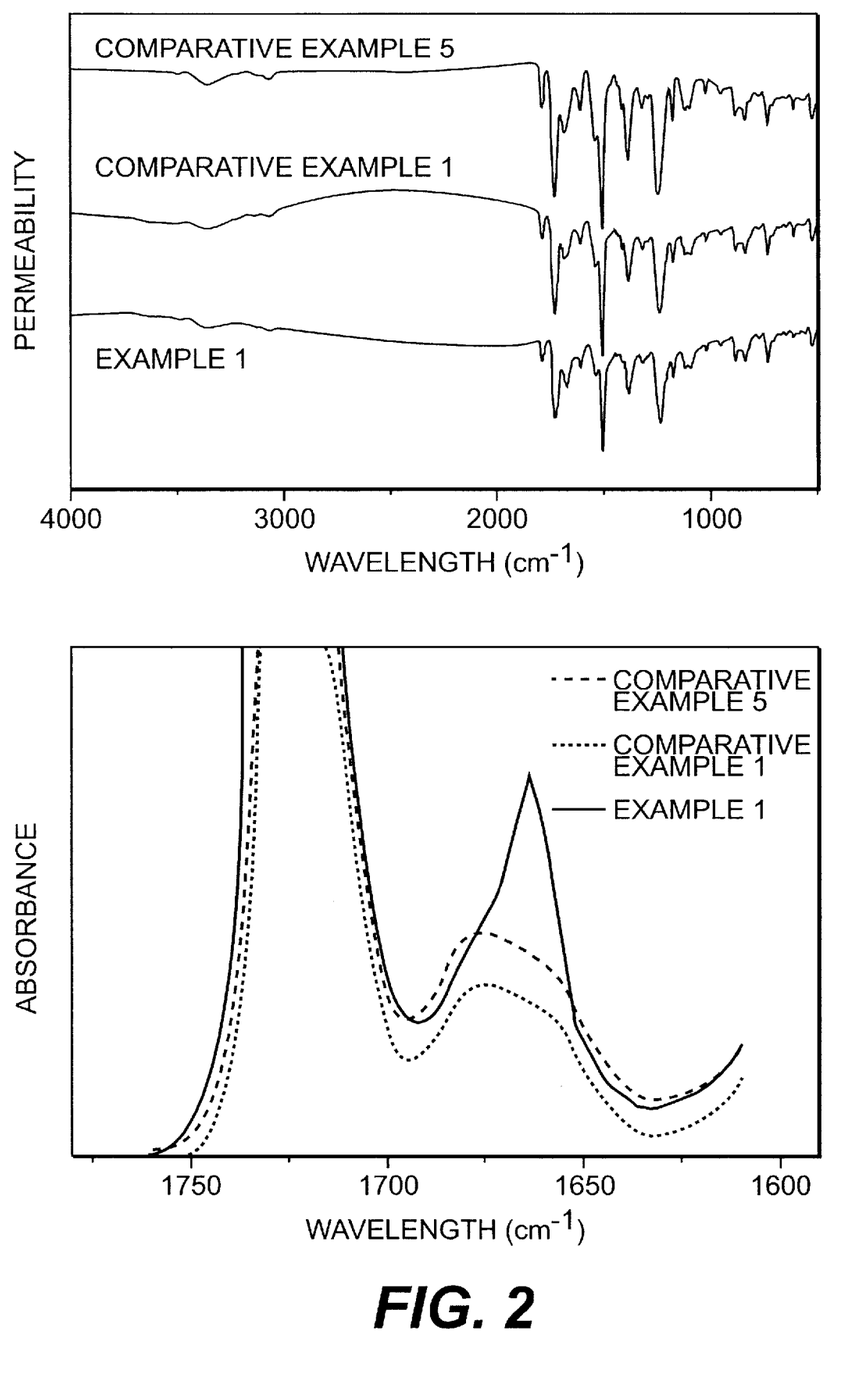
FIG. 2 shows IR spectrums of polyamide-imides prepared from oxydianiline having head-to-tail, random arrangement (randomly mixed structure of head-to-head or tail-to-tail and head-to-tail) and head-to-head backbones.

FIG. 2 is IR spectrums of polyamide-imides prepared from oxyaniline having head-to-tail backbone, random copolymers, and head-to-head backbone. Amide I peak (1663 cm 1)of —C=O in polyamide-imides having head-to-tail backbone shift about 10 cm-1 as compared with that of head-to-head backbone and that of random polymers due to hydrogen bonding. Therefore head-to-tail structure has stronger hydrogen bonding than the others and this strong hydrogen bonding affects directly at heat resistance, mechanical properties and gas separation properties.

As described above, the novel polyamide-imides having head-to-tail backbone of the present invention provide excellent heat and chemical resistance, physical and mechanical properties, and processability. In particular, they are useful in gas separation industries which require to separate oxygen, nitrogen or helium from the air due to excellent properties of gas permeability and selectivity.

What is claimed is:

1. A polyamide-imide having head-to-tail backbone in the following formula (1), (1)

wherein $Ar_1$ is selected from the group consisting of wherein $R_1$, $R_2$, $R_3$ and $R_4$ are the same or different and a hydrogen atom or $C_1$~$C_4$ alkyl group; and X is selected from the group consisting of —O—, —S—, —SO$_2$—, —CO—, —C(CH$_3$)$_2$—, —(CF$_3$)$_2$—,

2. A polyamide-imide having head-to-tail backbone according to claim 1, wherein the inherent viscosity of the polyamide-imide is in the range of 0.4–2.0 dL/g, the glass transition temperature is in the range of 200–500° C., the thermo decomposition temperature is in the range of 300–500° C., the gas permeability of oxygen is in the range of 0.00–10 barrer, the gas permeability of helium is in the range of 1–400 barrer, the gas permeability of nitrogen is in the range of 0.001–10 barrer, and the separation coefficient of helium to nitrogen is in the range of 10–500.

3. A polyamide-imide having head-to-tail backbone in the following formula (1), (1)

wherein $Ar_1$ is selected from the group consisting of

Ar₂ is wherein R₁, R₂, R₃ and R₄ are the same or different and a hydrogen atom or C₁~C₄ alkyl group; and X is selected from the group consisting of —O—, —S—, —SO₂—, —CO—, —C(CH₃)₂—, —(CF₃)₂—, 4. A polyamide-imide having head-to-tail backbone in the following formula (1),

(1)

wherein Ar₁ is

Ar₂ is wherein R₁, R₂, R₃ and R₄ are the same or different and a hydrogen atom or C₁ ~C₄ alkyl group; and X is selected from the group consisting of —O—, —S—, —SO₂—, —CO—, —C(CH₃)₂—, —(CF₃)₂—, 5. A polyamide-imide having head-to-tail backbone in the following formula (1), (1)

wherein $Ar_1$ is $Ar_2$ is wherein $R_1$, $R_2$, $R_3$ and $R_4$ are the same or different and a hydrogen atom or $C_1\text{--}C_4$ alkyl group; and X is selected from the group consisting of —O—, —S—, —SO$_2$—, —CO—, —C(CH$_3$)$_2$—, —(CF$_3$)$_2$—, 6. A polyamide-imide having head-to-tail backbone according to claim 3, wherein the inherent viscosity of the polyamide-imide is in the range of 0.4–2.0 dL/g, the glass transition temperature is in the range of 200–500° C., the thermo decomposition temperature is in the range of 300–500° C., the gas permeability of oxygen is in the range of 0.001–10 barrer, the gas permeability of helium is in the range of 1–400 barrer, the gas permeability of nitrogen is in the range of 0.001–10 barrer, and the separation coefficient of helium to nitrogen is in the range of 10–500.

7. A polyamide-imide having head-to-tail backbone according to claim 4, wherein the inherent viscosity of the polyamide-imide is in the range of 0.4–2.0 dL/g, the glass transition temperature is in the range of 200–500° C., the thermo decomposition temperature is in the range of 300–500° C., the gas permeability of oxygen is in the range of 0.001–10 barrer, the gas permeability of helium is in the range of 1–400 barrer, the gas permeability of nitrogen is in the range of 0.001–10 barrer, and the separation coefficient of helium to nitrogen is in the range of 10–500.

8. A polyamide-imide having head-to-tail backbone according to claim 5, wherein the inherent viscosity of the polyamide-imide is in the range of 0.4–2.0 dL/g, the glass transition temperature is in the range of 200–500° C., the thermo decomposition temperature is in the range of 300–500° C., the gas permeability of oxygen is in the range of 0.001–10 barrer, the gas permeability of helium is in the range of 1–400 barrer, the gas permeability of nitrogen is in the range of 0.001–10 barrer, and the separation coefficient of helium to nitrogen is in the range of 10–500.

* * * * *